US008146417B2

(12) United States Patent
Glasson et al.

(10) Patent No.: US 8,146,417 B2
(45) Date of Patent: Apr. 3, 2012

(54) HYDRAULIC ACCUMULATOR WITH POSITION SENSOR

(75) Inventors: Richard O. Glasson, Morris Plains, NJ (US); Kedar D Kulkarni, Parsippany, NJ (US)

(73) Assignee: Control Products, Inc., East Hanover, NJ (US)

( * ) Notice: Subject to any disclaimer, the term of this patent is extended or adjusted under 35 U.S.C. 154(b) by 1 day.

(21) Appl. No.: 12/792,396

(22) Filed: Jun. 2, 2010

(65) Prior Publication Data

US 2010/0307233 A1 Dec. 9, 2010

Related U.S. Application Data

(60) Provisional application No. 61/183,752, filed on Jun. 3, 2009.

(51) Int. Cl.
*G01L 7/00* (2006.01)

(52) U.S. Cl. .......................................................... 73/168

(58) Field of Classification Search ...................... 73/168
See application file for complete search history.

(56) References Cited

U.S. PATENT DOCUMENTS

| | | | | |
|---|---|---|---|---|
| 4,121,504 | A | 10/1978 | Nowak | |
| 4,286,386 | A | 9/1981 | Long | |
| 4,386,552 | A | 6/1983 | Foxwell | |
| 5,024,250 | A | 6/1991 | Nakamura | |
| 6,234,061 | B1 * | 5/2001 | Glasson | 92/5 R |
| 6,411,082 | B2 | 6/2002 | Glasson | |
| 6,450,048 | B1 | 9/2002 | Samuelson et al. | |
| 6,588,313 | B2 | 7/2003 | Brown et al. | |
| 6,694,861 | B2 | 2/2004 | Glasson | |
| 6,702,600 | B2 | 3/2004 | Glasson | |
| 6,866,545 | B2 | 3/2005 | Glasson | |
| 7,093,361 | B2 | 8/2006 | Glasson | |
| 7,100,861 | B2 | 9/2006 | Glasson | |
| 7,197,974 | B2 | 4/2007 | Glasson | |
| 7,290,476 | B1 * | 11/2007 | Glasson | 92/5 R |
| 7,300,289 | B2 | 11/2007 | Glasson | |
| 7,377,333 | B1 * | 5/2008 | Sugiura | 175/45 |
| 7,609,055 | B2 | 10/2009 | Glasson | |
| 7,716,831 | B2 | 5/2010 | Glasson | |
| 7,982,459 | B2 * | 7/2011 | Killian et al. | 324/240 |
| 2001/0018861 | A1 * | 9/2001 | Glasson | 92/5 R |
| 2003/0029310 | A1 * | 2/2003 | Glasson | 92/5 R |
| 2004/0050439 | A1 * | 3/2004 | Weber | 138/30 |
| 2006/0017431 | A1 | 1/2006 | Glasson | |
| 2006/0144217 | A1 * | 7/2006 | Neumann | 91/1 |
| 2006/0236539 | A1 * | 10/2006 | Glasson | 29/890.06 |
| 2007/0157612 | A1 | 7/2007 | He | |
| 2008/0190104 | A1 * | 8/2008 | Bresie | 60/476 |
| 2010/0050863 | A1 * | 3/2010 | Wenker et al. | 92/5 R |
| 2010/0161184 | A1 * | 6/2010 | Marathe et al. | 701/50 |
| 2010/0307233 | A1 * | 12/2010 | Glasson et al. | 73/168 |

OTHER PUBLICATIONS

The International Search Report and Written Opinion by the International Searching Authority, issued on Aug. 11, 2010, in the PCT application No. PCT/US10/37095.

* cited by examiner

*Primary Examiner* — Lisa Caputo
*Assistant Examiner* — Jamel Williams

(57) ABSTRACT

A linear position sensor is installed inside the pressure vessel of a hydraulic accumulator to provide positional information for the moveable element inside of the accumulator. The positional information provides accumulator charge condition data for use in hydraulic systems such as vehicular regenerative braking systems and generalized industrial accumulator systems. Charge condition data allows for optimized control and operation of the hydraulic system.

19 Claims, 10 Drawing Sheets

HYDRAULIC ACCUMULATOR WITH POSITION SENSOR

CROSS REFERENCE TO RELATED CASE

This application claims priority from U.S. Provisional Patent Application No. 61/183,752 filed Jun. 3, 2009, entitled "Position Sensor" which is incorporated herein by reference.

FIELD OF INVENTION

This invention relates to positional sensors for use in regenerative energy systems in general, and more particularly to a liner positional sensor for use in a hydraulic accumulator.

BACKGROUND OF THE INVENTION

With interest in improved energy efficiency and the use of alternative energy sources, it has been recognized that vehicles, especially those that make frequent stops and starts such as delivery vehicles, could be made more efficient if the energy normally lost in decelerating or braking the vehicle could be somehow collected, stored and reused to accelerate the vehicle. Hydraulic accumulators can be used to store such energy.

A hydraulic accumulator is a device that stores potential energy in the form of a compressed gas or spring, or by a raised weight to be used to exert a force against a relatively incompressible fluid. It is often used to store fluid under high pressure or to absorb excessive pressure increases. The increase in pressure within an accumulator is directly related to the amount of stored energy (charge) available in the accumulator at any given instant. To reliably utilize the stored energy within an accumulator, and optimize a hybrid type system, a sensor is required to accurately measure and report the potential energy stored within an accumulator.

For example, accurately knowing the amount of charge in an accumulator allows control software to "project" the contribution the main engine will have to provide in order to maintain the proper power reserves during operation. Accurate charge data also allows for full utilization of the accumulator charging range. Additionally, having an accurate sensor with the ability to monitor an accumulator's charge state allows a system to quickly detect hydraulic leaks.

Traditionally, pressure transducers have been used to obtain approximate charge state data in accumulators. This approximation, however, is insufficiently accurate to be used in a regenerative system because of changes in ambient temperature. Due to these changes the pressure of a gas within an accumulator may vary significantly for a given volume. Additionally, by using pressure alone to determine charge state, one must assume that there are no leaks or changes in the gas charge.

The most direct method for determining the charge state of an accumulator is to measure the position of a piston or bladder inside the accumulator. A piston or bladder's position within an accumulator is directly proportional to the available energy in the accumulator. However, obtaining an accurate position of the piston or bladder within an accumulator can be a difficult task. Internal pressures within an accumulator can exceed 5000 psi and a visible detection method is not possible or is often very inaccurate or difficult to implement. Additionally, an accumulator contains hydraulic fluid and any sensor with direct contact must be able to operate within such conditions and provide adequate sealing capabilities.

Therefore it is advantageous for sensing technology used in hydraulic system to be highly accurate, easily integrated, operate under high pressure and not interfere with the sealing required to maintain the high hydraulic pressure in which it operates.

Sensors, such as a linear variable displacement transducer (LVDT), are inductive sensor used to measure relatively short displacements within such a hydraulic systems. A critical drawback to any LVDT is its relatively short measurement range. Such a sensor is not practical suited to directly measure a long linear translation within a hydraulic accumulator.

It is therefore desirable to have a hydraulic accumulator with a linear position sensor installed inside the pressure vessel to provide positional information for the moveable element inside of the accumulator, such as a piston or bladder, however other type of accumulators are also contemplated. Such positional information provides the accumulator charge condition data for use in hydraulic systems such as vehicular regenerative braking systems and generalized industrial accumulator systems. Access to such charge condition data allows for optimized control and operation of the hydraulic system. The sensor may include a high-pressure signal connector for conveying the electrical signals into and out of the pressure vessel. The sensor may be fixed to the case of the accumulator or mounted in the neck of the accumulator and has a connecting cable that is attached to the moving element inside the accumulator. The accumulator may be of several types, including a piston-type accumulator or a bladder-type accumulator. The sensor may be installed on either the gas side of the pressure vessel or on the oil side of the pressure vessel.

SUMMARY OF THE INVENTION

The use of linear sensors to accurately measure distance within hydraulic pistons is known, as described in U.S. Pat. Nos. 6,234,061 and 6,694,861, both by Glasson and incorporated herein by reference. However, use of such a sensor in combination with a hydraulic accumulator to accurately measure stored potential energy for use with a regenerative energy source is previously unknown.

In order to use a hydraulic accumulator in a regenerative system, accurate measure of the stored energy within a hydraulic accumulator must be known. To determine this, one needs to utilize a sensor capable of operating within the required pressures of the hydraulic vessel, a sensor that is easy to install, a sensor that does not interfere with the sealing of the hydraulic chamber, and a sensor that is capable of measuring long piston displacement within a hydraulic accumulator. One such sensor is the SL720 linear position sensor, from Control Products Inc., of East Hanover, N.J.

An exemplary sensor such as the SL720, uses a fine lead screw to couple an LVDT to a recoil spool. When the spool rotates, it causes the screw thread to turn and produce a small linear translation that is read by the LVDT. In this way, the LVDT is coupled to the long translations of an object such as a piston in an accumulator, producing accurate absolute measurement of piston motion and position.

The recoil spool approach provides some other advantages. For example, the sensor's range does not need to be matched to the specific travel requirement of a particular application. In this configuration, a sensor package covers any stroke up to at the maximum length of the flexible connector, and because of the flexible connector, some misalignment is tolerated. This allows the sensor to be integrating with, for example, a bladder-type accumulator or a telescoping cylinder that may not be optimally aligned.

Such a sensor can be used in either the gas side or the oil side of an accumulator and fulfills the requirement for minimal design impact. The accumulator of the present invention therefore contains a linear position sensor suitable for use with a high-pressure electronics connector and integral signal conditioning, thereby solving the problem of conducting electrical signals into and out of the pressure environment.

In an exemplary embodiment, the sensor mounts inside a hydraulic accumulator mounted on a vehicle for use as a regenerative energy source. The sensor within the accumulator provides a voltage or current signal indicative of the position of a piston within the accumulator and directly related to the amount of stored potential energy within the accumulator. The sensor provides a connector, attached between a moving reference point within the accumulator and a converting element, for sensing the displacement of the reference point. The converting element converts the accumulator displacement to a proportional displacement of a translating member. A precision transducer senses the displacement of the translating member and provides an electrical output signal proportional to the reference point's position within the accumulator.

In one exemplary embodiment according to the principles of the invention, a flexible connector of the sensor, such as a cable is attached to the end of a piston or bladder within the hydraulic accumulator. A converting element on the sensor comprises a pick-up spool coupled to the other end of the connector and rotatable about an axis. The spool is under tension from a recoil mechanism, such as a spring, coupled to the spool. A translating member, which can be a lead screw, engages threads on the interior of the spool, and translates along an axis when the spool rotates. A transducer is disposed to sense a position or motion of the translating member, and provides an output signal proportional to, and therefore indicative of, the position of the translating member. The transducer can be a linear variable differential transformer (LVDT), which is a non-contacting transducer. Of course, other transducers, including those using contacting components, can be used.

For use in a hydraulic accumulator, the sensor operates as follows. The converting element is attached to the accumulator. As a piston or bladder moves within the accumulator, the spool feeds out or draws in cable, thereby tracking the piston or bladder's linear displacement. As the piston or bladder moves toward the spool, the spring causes the spool to wind the cable. When the piston or bladder moves away from the spool, the cylinder force overcomes the spring tension and pulls cable off the spool. The spool is in threaded engagement with a lead screw. As the spool rotates, the spool and lead screw convert the rotary motion of the spool to a linear displacement of the lead screw. The displacement is proportional to the piston or bladder displacement and accordingly, the stored energy. The lead screw is attached to an LVDT core that moves within an LVDT body when the cylinder moves. The LVDT delivers an electrical signal at its output, which can be configured as a position signal.

It will be appreciated by one skilled in the art, that other sensor configurations may be utilized and the scope of the invention is not limited to the embodiments disclosed herein.

DETAILED DESCRIPTION

A hydraulic accumulator with a linear positional sensor according to the principles of the invention is capable of providing accurate positional information of the movable elements inside the accumulator. Such accurate positional information provides accumulator charge condition data for use in hydraulic systems such as vehicular regenerative braking systems and generalized accumulator systems. Access to such charge condition data allows for optimized control and operation of the hydraulic system.

Figure 1:
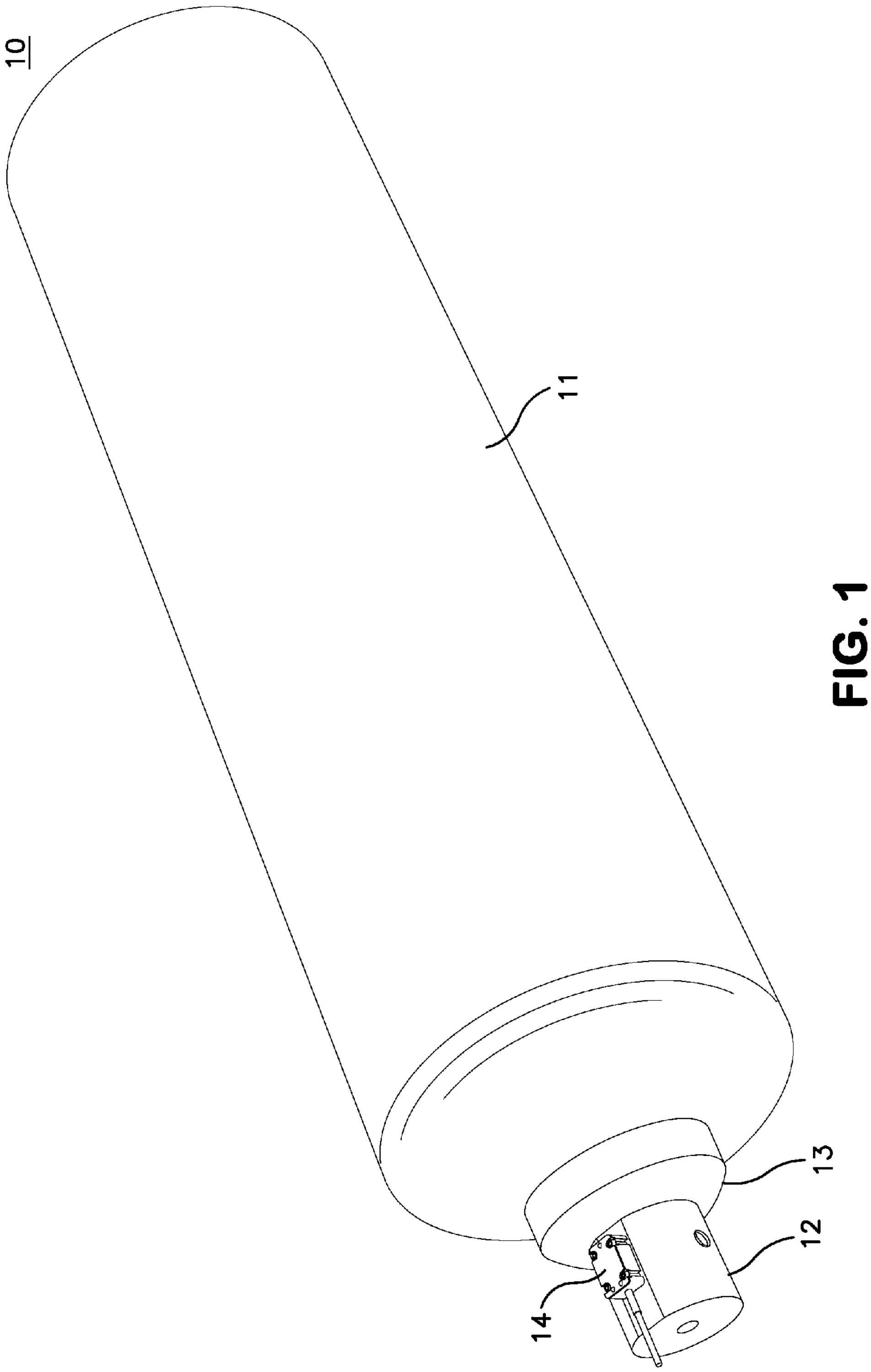
FIG. 1 shows an exemplary hydraulic accumulator with a piston-sensing position sensor in accordance with the invention.

FIG. 1 discloses a position-sensing accumulator system 10 containing an accumulator 11, sensor housing 12, resilient collar 13, and signal conditioner 14. Accumulator 11 may be a piston type accumulator or a bladder type accumulator. Sensor housing 12 contains a hydraulic position sensor (not shown). One sensor particularly suited for such application is for example the SL720 linear position sensor, from Control Products Inc., of East Hanover, N.J. Signal conditioner 14, may be any type of signal conditioning circuit, that has the electronics integrated into a high-pressure assembly so as to avoid potential leaks when the accumulator is under pressure. One such signal conditioner is for example the SC450 Signal Conditioning Module also from Control Products Inc. Typically, the sensor will be positioned adjacent to or in close proximity to signal condition 14 within sensor housing 12 at the top of accumulator 11, however, other installation configurations are possible.

Figure 2:
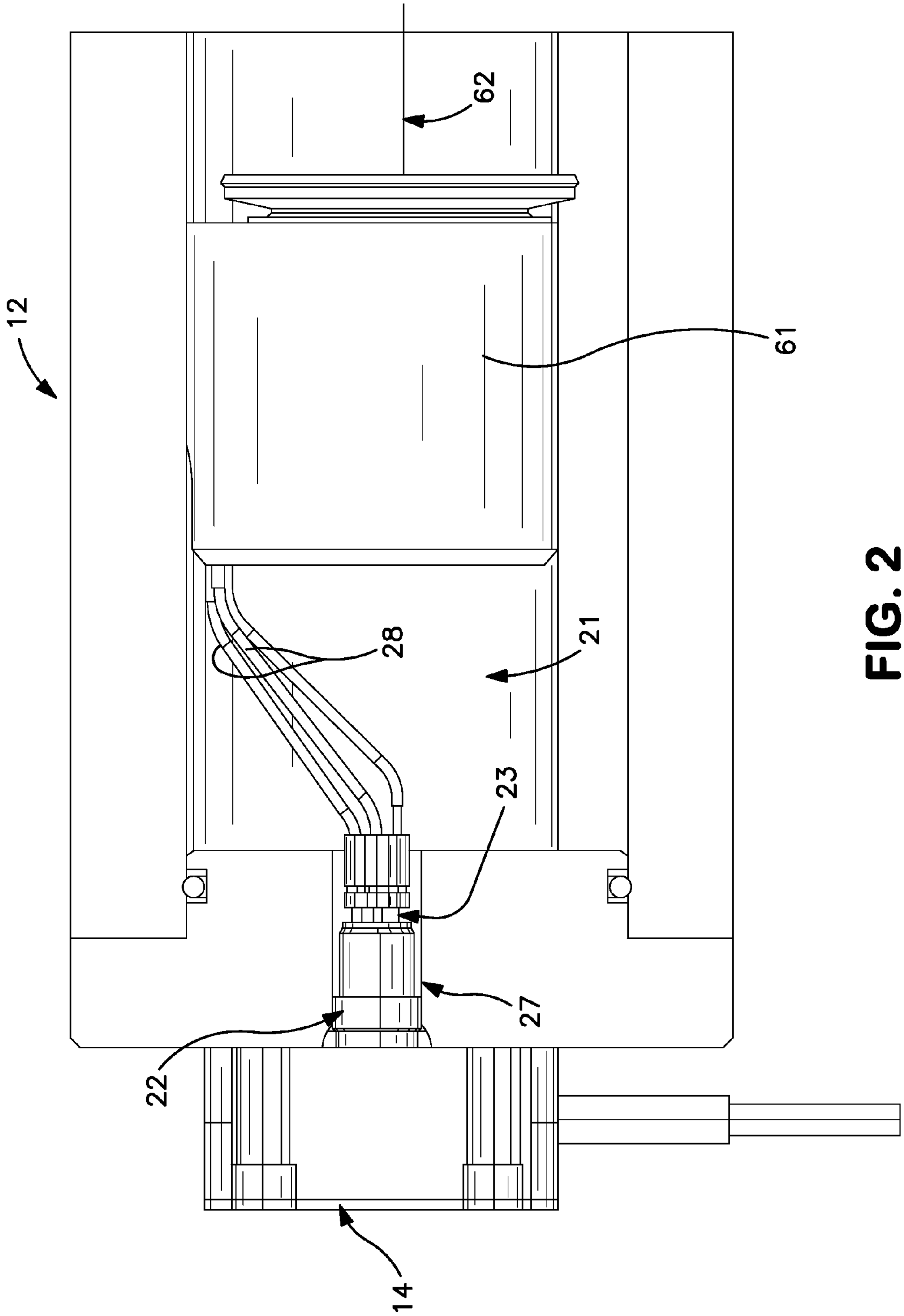
FIG. 2 is an exemplary embodiment of a sensor and remote connection within an accumulator in accordance with the invention

FIG. 2 depicts an accumulator with the sensor 61 located remotely from signal conditioner 14. As can be seen from FIG. 2, signal conditioner 14 does not need to be mounted directly on the sensor 61. FIG. 2 depicts signal conditioner 14 and signal interconnect 22 mounted external to the pressurized cavity 21 and sensor 61 located within cavity 21. In this embodiment, signal conditioner 14 can be remotely located from sensor 61 allowing more design freedom. Signal cord set 23 need not be placed in a prescribed location with respect to sensor 61. Signal interconnect 22 and signal cord set 23 include a sealing ring 27 to contain the pressure of pressurized cavity 21 and act as the high pressure seal. In this embodiment, in addition to being an electrical connector, signal interconnect 22 allows a user to locate the high-pressure seal wherever it is convenient on accumulator 11. The signal cord set 23 connects to wires 28, which can be any length, that extend from sensor 61 and may have a standard receptacle on the distal end. Once sensor 61 is located within accumulator 11, a user simply plugs wires 28 from sensor 61 onto the cord set 23 and secures the cord set into the pressure port. In this way, as will be appreciated by those skilled in the art, the sensor 61 may be placed off-center, at the top or bottom of cylinder 30, while the signal conditioner 14 may be located at a different location such as the top or side. As will be appreciated by those skilled in the art, disclosure of the Control Products SC450 signal conditioner with its high-pressure interconnect is but one example of a high-pressure interconnect suitable for use with the present invention and any high-pressure interconnect may be used without departing from the spirit of the invention.

Figure 3:
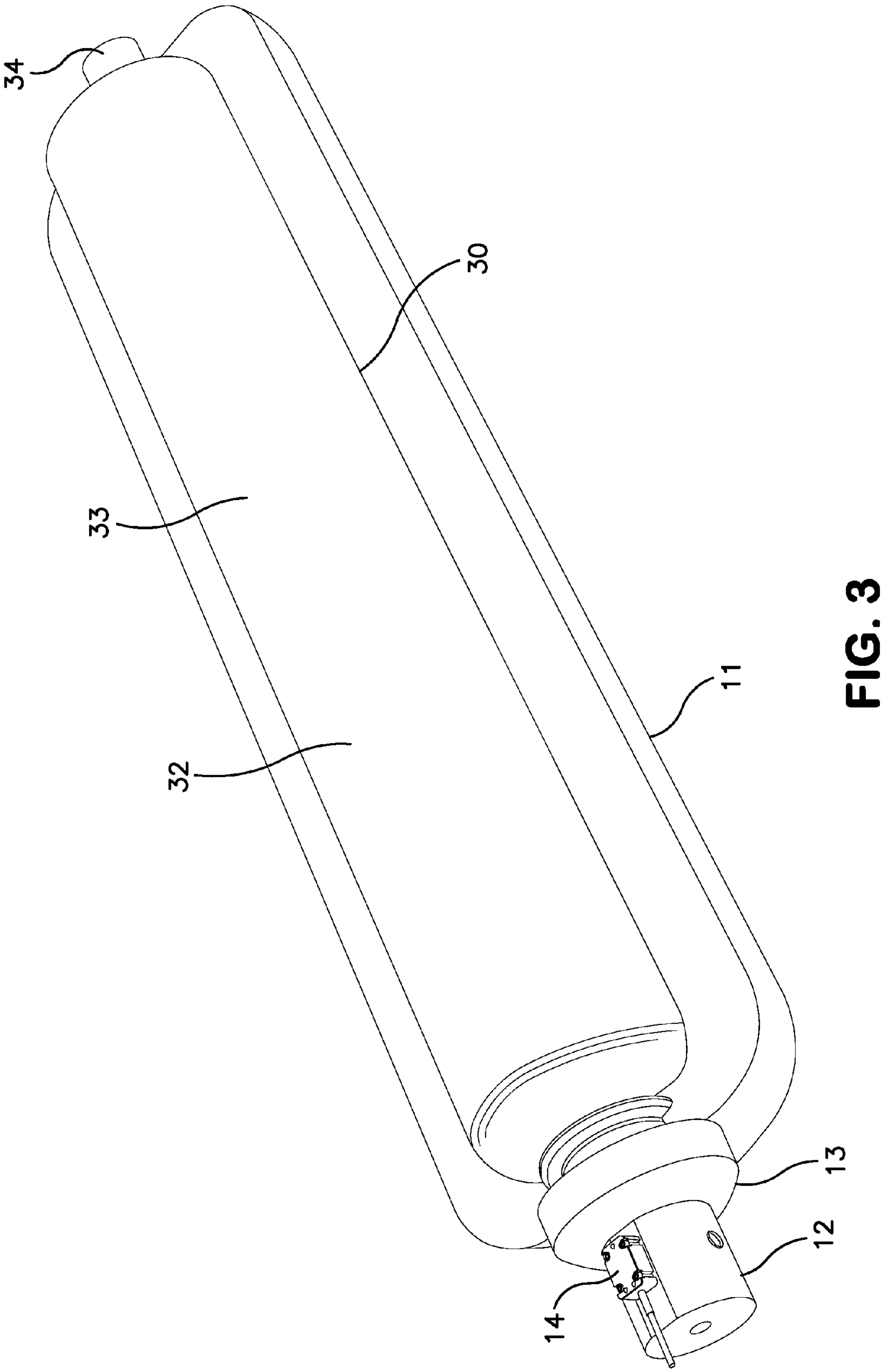
FIG. 3 is a cut away view of the accumulator of FIG. 1 showing the steel inner body.

FIG. 3 discloses accumulator 11 of FIG. 1 with a cut away view to disclose the internal cylinder 30 which houses gas side 32 and fluid side 33 of accumulator 11. In communication with fluid side 33 is fluid port 34 which allows for the transmission of fluid, typically hydraulic fluid, into and out of cylinder 30 as hydraulic pressure increases and decreases.

Figure 4:
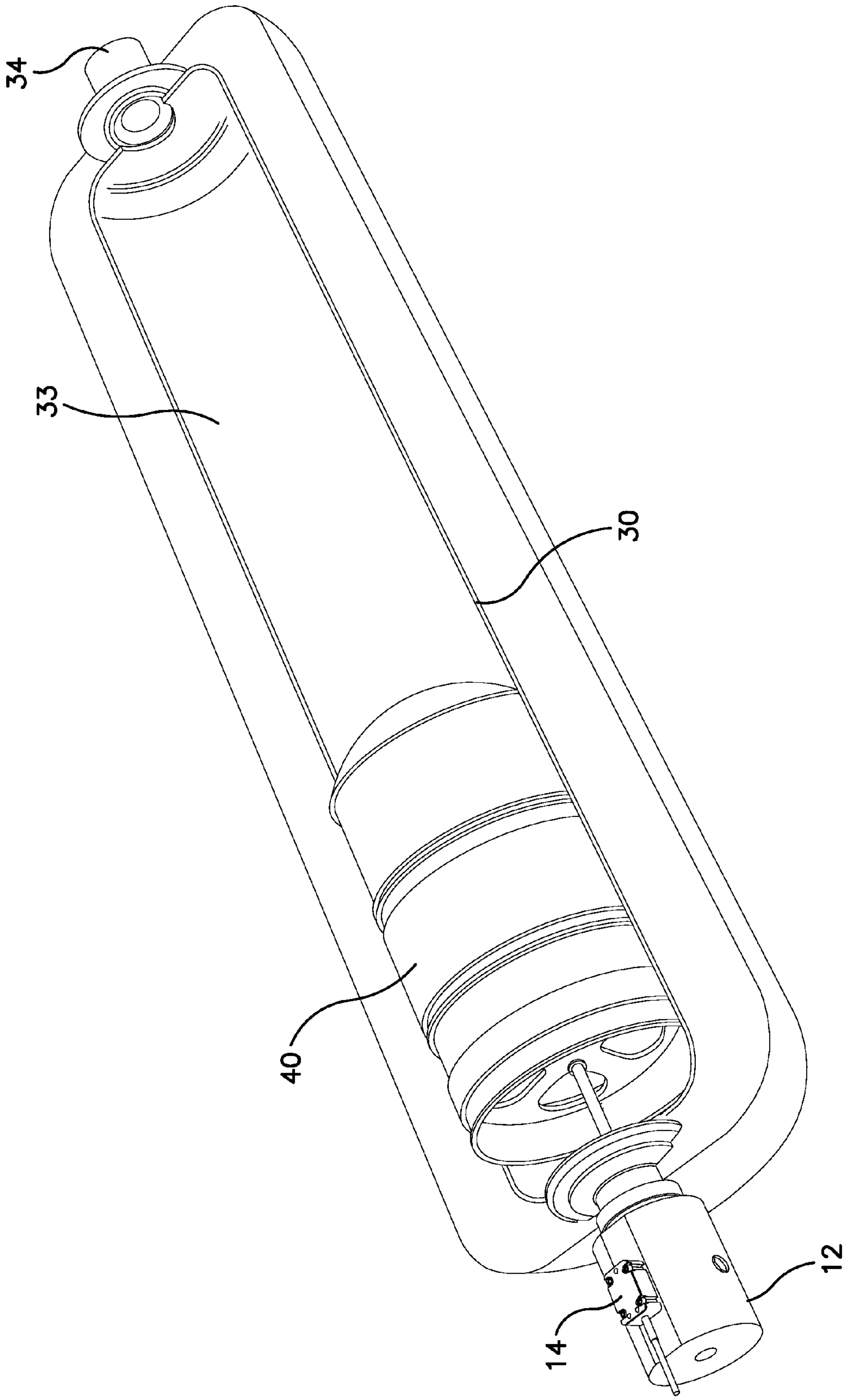
FIG. 4 is a further cut away view of the accumulator of FIG. 1, showing the internal piston located within the steel inner body.

FIG. 4 is a cut away view of internal cylinder 30, showing fluid side 33, fluid port 34, and piston assembly 40. In operation, piston assembly 40 traverses the length of cylinder 30 as fluid 33 is injected into or purged from cylinder 30 by an external hydraulic pump (not shown). Piston assembly 40 may be a deeply dished piston, although other configurations are possible.

Figure 5:
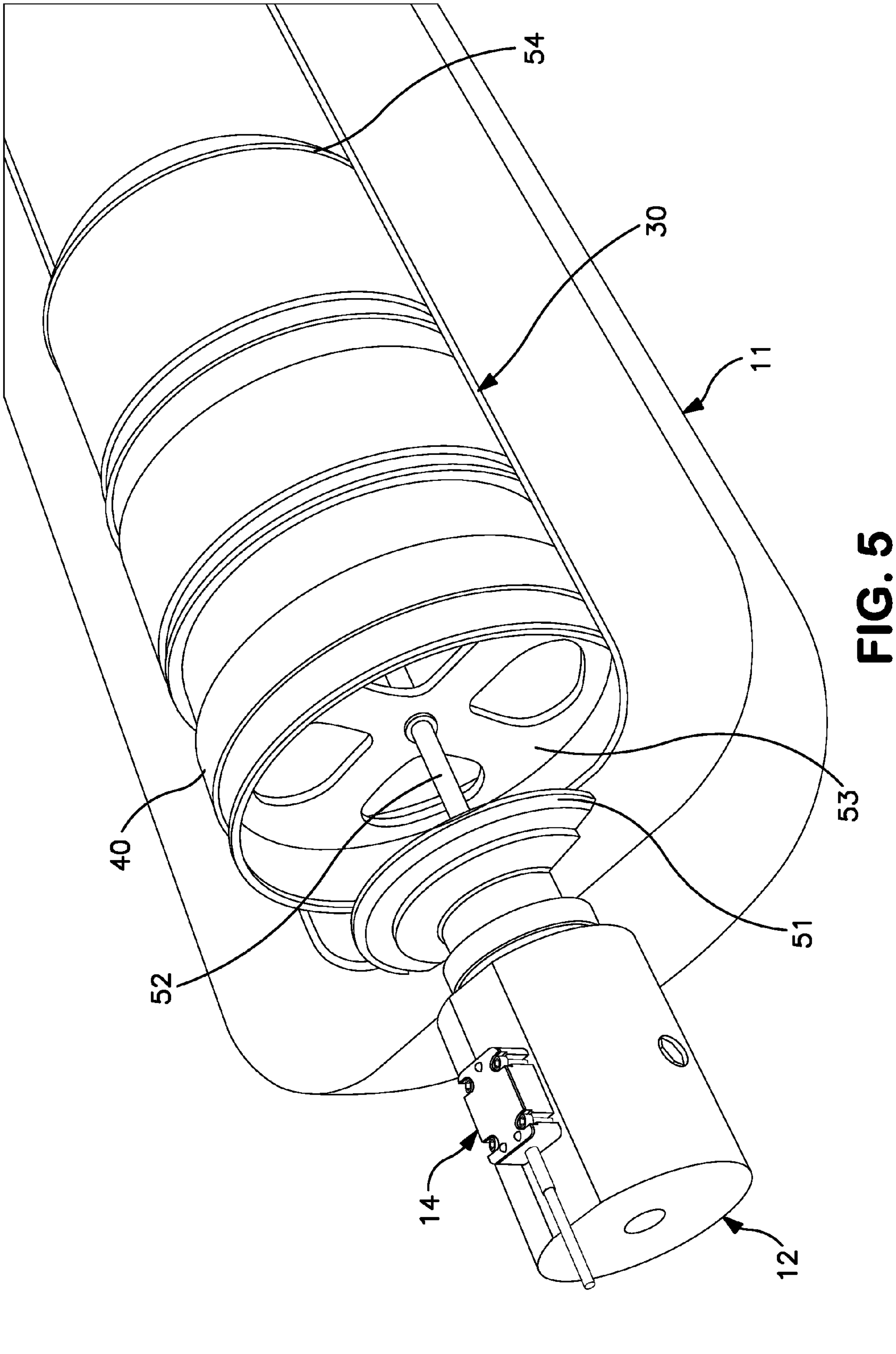
FIG. 5 is an exemplary embodiment of the sensor-piston interface within the accumulator in accordance with the invention.
Figure 6:
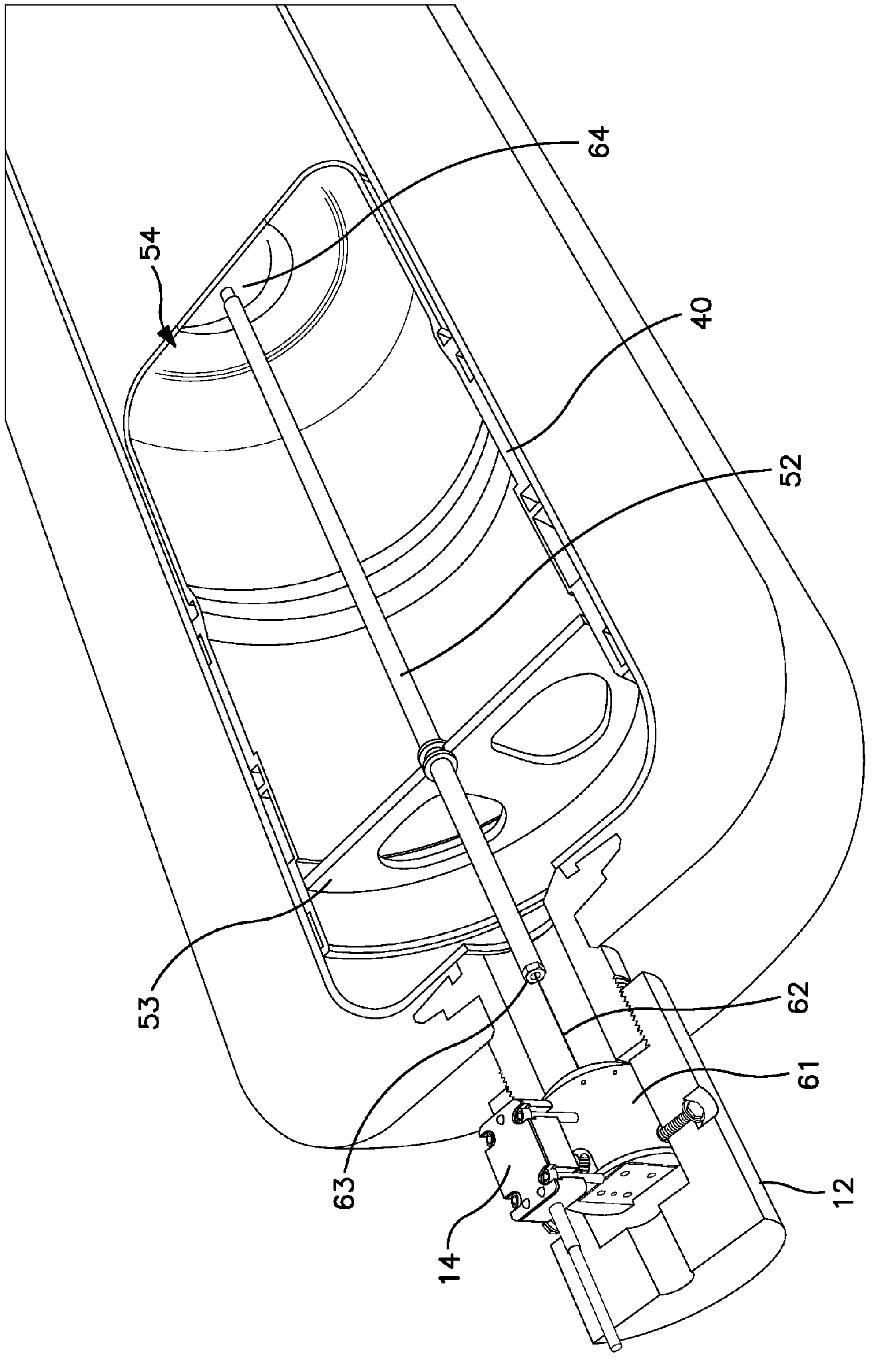
FIG. 6 is a sectional view of the embodiment disclosed in FIG. 5.

FIG. 5 shows a more detailed cut away view of FIG. 4 including cylinder 30, signal conditioner 14, sensor house 12, piston assembly 40, end fitting 51, sensor extension 52, and centering disk 53. One side of sensor extension 52 connects to sensor 61 located inside sensor housing 12 and the opposite end, after passing through the center of centering disk 53, is threaded to base 54 of piston assembly 40. Piston end 40 acts as the reference point to measure the charge condition within cylinder 30. In the embodiment depicted in FIG. 6, position sensor 61 is mounted within cylinder 30, a linear position sensor is ideal, although other sensors may be utilized. A linear position sensor generates an electrical output in relation to a mechanical movement of the sensor mechanism. In this embodiment, flexible connector 62 connects to sensor extension 52 via connector 63. As can be seen, sensor extension 52 passes through centering disk 53 and attaches via threaded connector 64 to the distal end of piston assembly 40. Flexible connector 62 is extendable up to at least the length of cylinder 30. As the piston assembly 40 traverses cylinder 30, flexible connector 62 uncoils and recoils into sensor 61. In this embodiment, as flexible connector 62 is extended from sensor 61, it causes a mechanical mechanism within sensor 61 to rotate. The motion is conveyed to a LVDT within sensor 61 and translated into an electrical signal that is conveyed to signal conditioner 14. Signal conditioner 14 may provided amplification, filtering, converting, and other processing required to make output signals of sensor 61 suitable for reading by a remote processor or controller.

Sensor 61 maybe of a type containing a flexible connection or filament to measure the distance traversed within cylinder 30. Flexible connector 62 connects to connector extension rod 52 via connector 53. Extension rod 52 passes through the center of centering disk 53 to ensure that the connector does not contact the sides of cylinder 30. Further, centering disk 53 also serves to hold sensor extension 52 in place. Sensor extension 52 allows connection of flexible connector 62 to the bottom of piston assembly 40 with no "dead length". Dead length refers to length that flexible connector 62 has to traverse, but which is not used in the actual operation of the system (i.e. no measurement travel). In operation, as the amount of fluid within cylinder 30 is increased or decreased piston assembly 40 and accordingly the charge reference point will traverse the length of cylinder 30 causing flexible connector 62 to extend and recoil with the amount of fluid present. Knowledge of this positional information allows one to accurately know the charge or potential energy stored in the accumulator. Position information from sensor 61 is output to signal conditioner 14 as an electrical signal. This signal can be conditioned and used in a feedback control system, a user interface or any system where such a signal is desirable.

Figure 7:
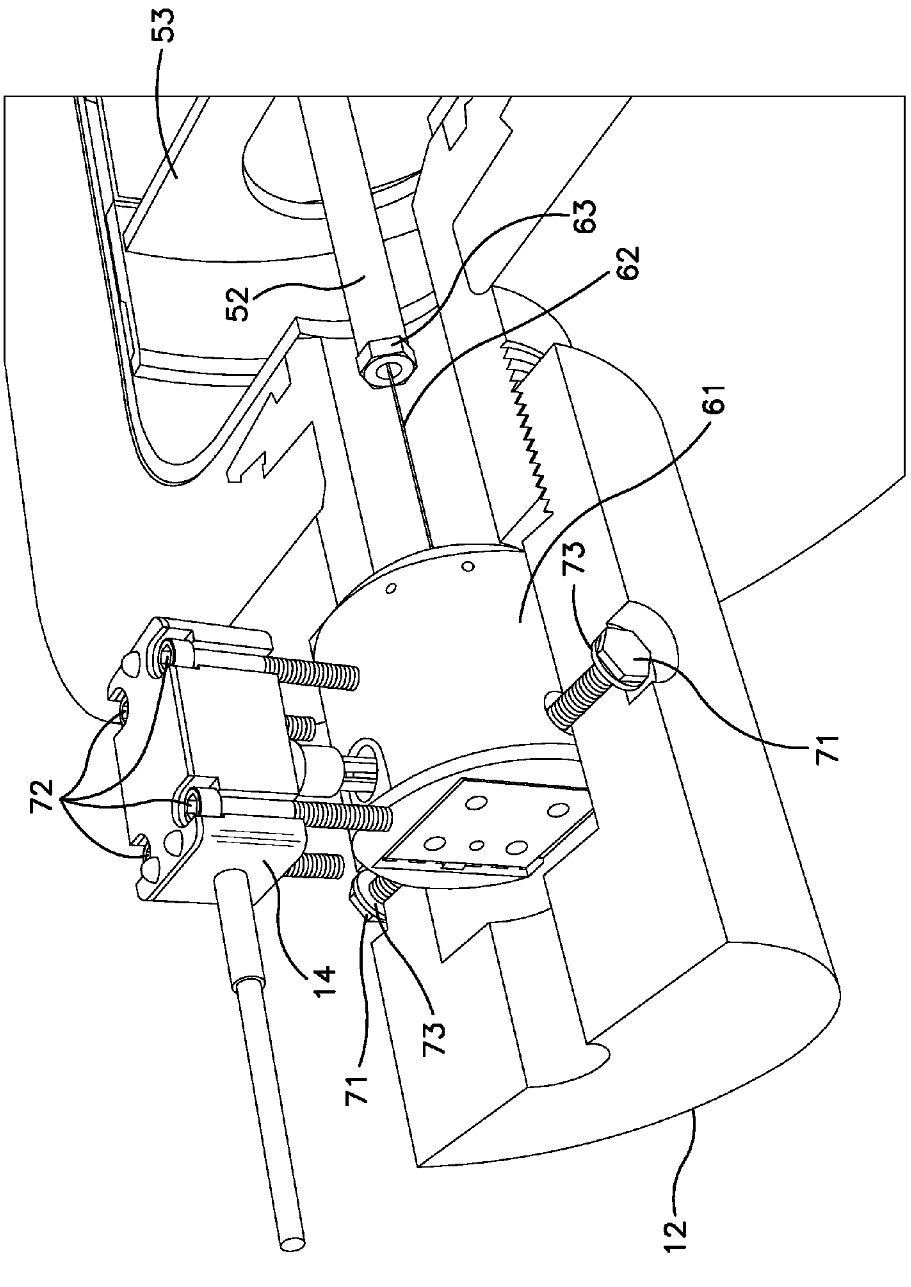
FIG. 7 is a further sectional view of a piston and sensor connection depicted in FIG. 5.

FIG. 7 depicts sensor housing 12, sensor 61, signal conditioner 14, bolts 71 and 72, seals 73 and accumulator 11. As can be seen, sensor 61 is mounted completely within sensor housing 12 by bolts 71. Seals 73 maintain the integrity of the pressure within canister 30 and allow sensor 61 to be easily mounted inside canister 30. Bolts 72 allow signal conditioner 14 to be directly mounted to sensor housing 12. As shown in this embodiment, sensor 61 and signal conditioner 14 are in direct contact, although as depicted in FIG. 2, they may also be remotely located. Flexible connector 62 connects to sensor extension 52 via connector 63. By passing sensor extension 52 through centering disk 53 the flexible connector 62 does not encounter the sides of cylinder 30 and is free to move within the cylinder as piston assembly 40 traverses cylinder 30 with the changes in pressure and fluid.

Figure 8:
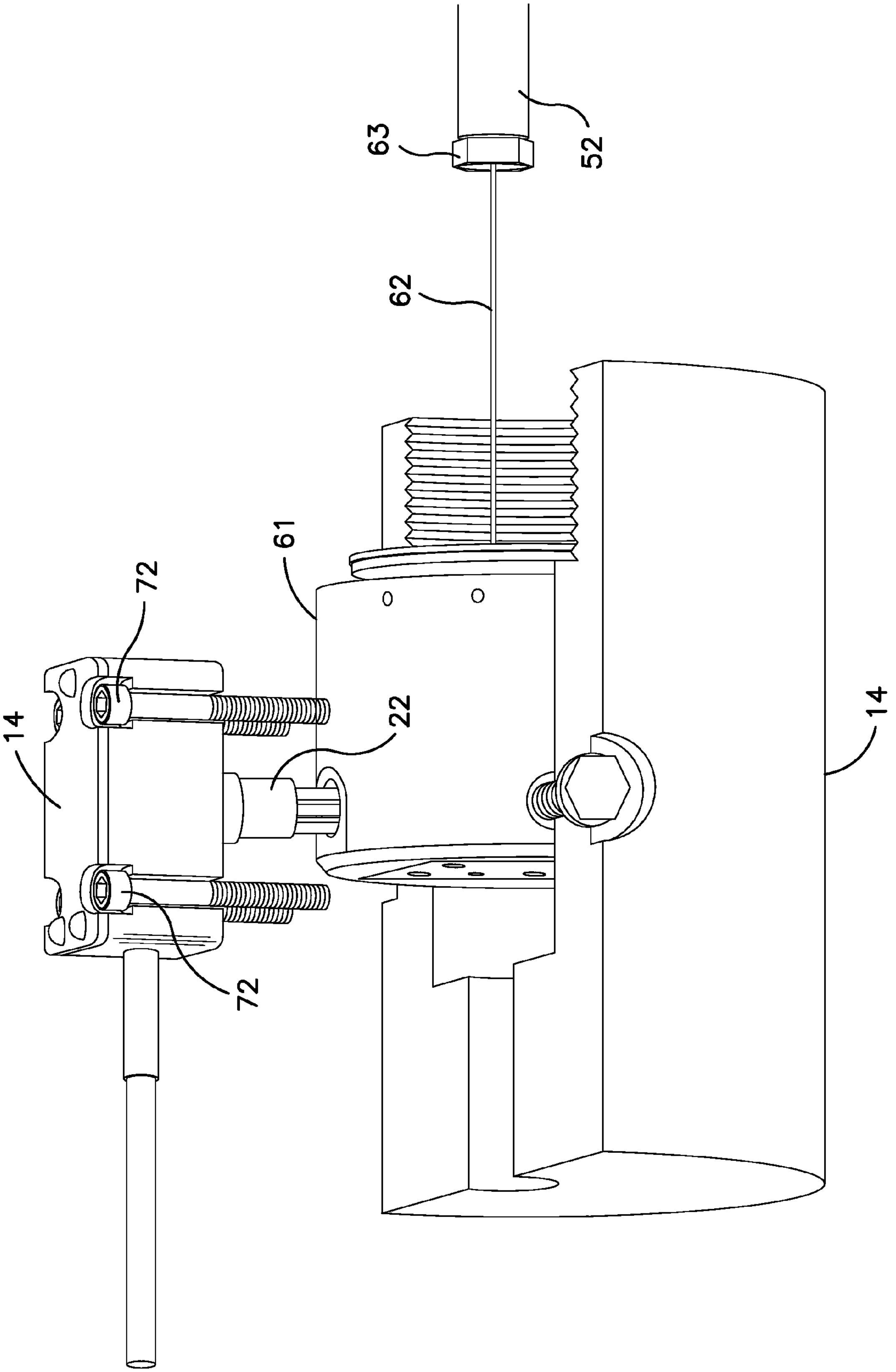
FIG. 8 is an exploded view of an exemplary embodiment of the sensor/signal interconnect in accordance with the invention.

FIG. 8 depicts an embodiment of the present invention utilizing a linear position sensor 61 with flexible connector 62 extending between sensor 61 and sensor extension 52. Mounted on the sensor housing 12 (shown in a cut away view) and in communication with sensor 61 is signal conditioner 14. As noted above, signal conditioner 14 need not be mounted adjacent to sensor 61 and can be remotely located as depicted in FIG. 2.

Figure 9:
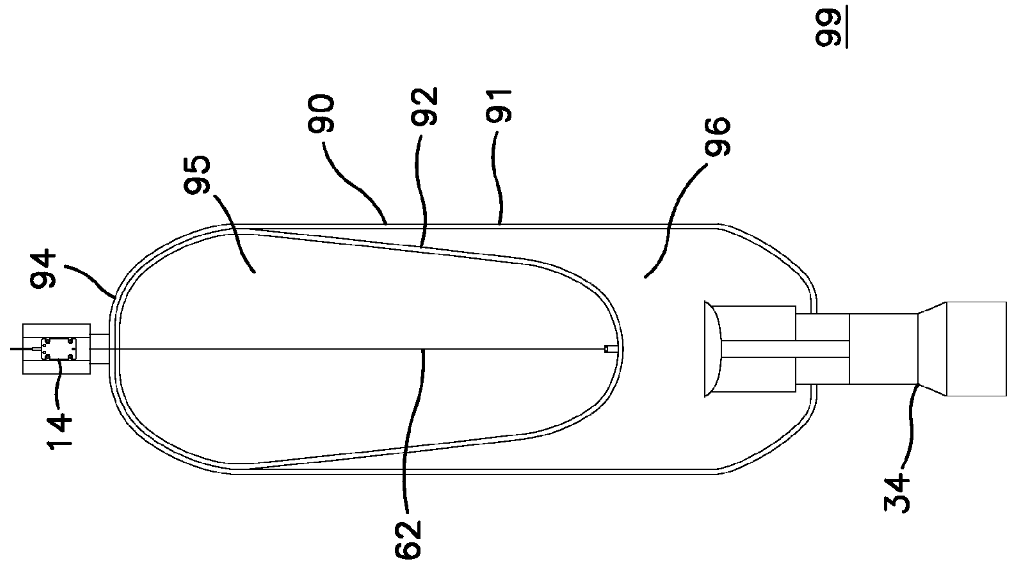
FIG. 9 is a view of an exemplary position-sensing bladder accumulator in accordance with the invention.

FIG. 9 discloses the sensor system utilizing a bladder type accumulator. As seen in FIG. 9 bladder accumulator 99 comprises an accumulator shell 91, accumulator bladder 92, fluid port 93, sensor package 94 made up of sensor, LVDT and a signal conditioner 14, flexible connector 62, sensor gas volume 95 and oil volume 96. Accumulator shell 91 is typically a hard canister or shell made from aluminum, although other materials such as steel, fiberglass, or composite materials may also be used Accumulator bladder 92 is an expandable membrane that that expands and contracts based on the sensor gas volume 95. Oil volume 96 is comprised of an incompressible fluid, such as hydraulic fluid, although other fluids may be used. Flexible connector 62, extends from sensor 61 in sensor package 94 and attaches to the distal end or bottom of bladder 92, by any one of several known means, such as adhesives, affixing to a mounted connector, etc. As oil volume 96 increases and decreases, accumulator bladder 92 will expand and contract, thereby causing the length of flexible connector 62 to vary. As the flexible connector 62 uncoils or recoils that motion is detected by the LDVT and converted into an electrical signal. Sensor 61 senses these changes and reports the position of the bottom of accumulator bladder 92 to a controller external to the accumulator via sensor conditioner 14. The exact position of the distal end of accumulator bladder 92 and accordingly, the amount of fluid or oil volume 96 and the amount of charge present is therefore known. As one skilled in the art will appreciate, once, the exact position of the bladder is known, the amount of potential energy or charge stored within the accumulator can be calculated.

Figure 10:
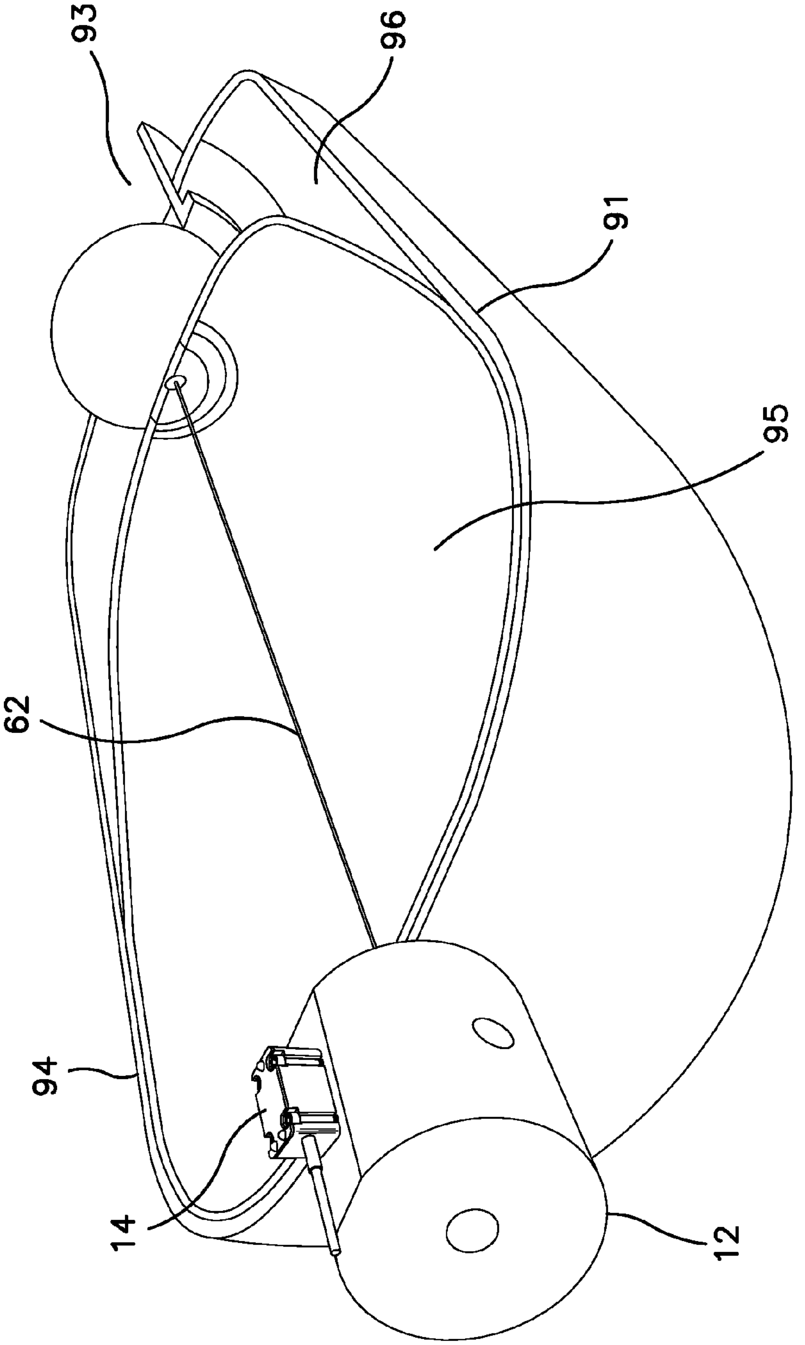
FIG. 10 is a cutaway view of the position-sensing bladder accumulator of FIG. 9 showing the flexible connector connected to the bladder.

FIG. 10 shows a cross section of a bladder type accumulator showing sensor package 94, with flexible connector 62 extending from sensor 61 through gas volume 95 and connecting to the distal end of accumulator bladder 92. As oil volume 96 within the accumulator shell 91 enters and exits the fluid port 93, sensor cable 62 either extends or recoils back into sensor 61. Sensor 61 through the translation of mechanical movement generates an electrical signal and conveys that signal external to the accumulator shell 91 via its connection to signal conditioner 14. That information can then be utilized by any end user control to manage the amount of energy stored within the accumulator.

As will be appreciated by those skilled in the art, the above invention is not limited to the embodiments disclosed, as other mechanisms may be utilized without departing from the spirit of the invention.

What is claimed:

1. A system for measuring the charge condition of stored energy within a cylinder comprising a hydraulic accumulator;

a first element configured to move linearly along a longitudinal axis within an interior volume of the hydraulic accumulator to adjustably separate an oil-containing portion of the interior volume on an oil side of the accumulator from a gas-containing portion on a gas side of the accumulator;

a sensor package for sensing a current position of the first element along the longitudinal axis; and an electrical connector connected to the sensor package for signaling the position of the first element within the hydraulic accumulator, wherein the hydraulic accumulator is a piston-type accumulator and the first element comprises:

a piston having a cylindrical wall and a base wall, the cylindrical wall extending in the direction of the longitudinal axis and the base wall extending transversely away from the longitudinal axis, the cylindrical wall and the base wall being integrally joined to define a closed, distal end of the first element, an extender fixedly attached to a surface of the base wall within an interior volume of the piston and extending along the longitudinal axis beyond an open, proximal end of the first element, and a centering disk that carries the extender, the centering disk being positioned away from the base wall within an interior volume of the piston and extending transversely away from the longitudinal axis to meet an interior surface of the cylindrical wall, whereby the centering disk and the base wall maintain the position of the extender along the longitudinal axis.

2. The system of claim 1 wherein the sensor package is installed on the oil side of the accumulator.

3. The system of claim 1 wherein the sensor package is installed on the gas side of the accumulator.

4. The system of claim 1 where the sensor package is a linear position sensor in contact with a linear variable displacement transducer.

5. The system of claim 4 wherein the linear position sensor contains a flexible connector.

6. The system of claim 1 wherein the sensor package contains a flexible connector.

7. The system of claim 6 wherein the flexible connector is connected to a the distal end of the extender.

8. The system of claim 1 further comprising a signal conditioner in communication with the sensor package.

9. The system of claim 8 wherein the signal conditioner provides a pressure seal to the hydraulic accumulator.

10. The system of claim 9 wherein the signal conditioner is remotely located from the sensor package.

11. The system of claim 9 wherein the signal conditioner is remotely located from the sensor package.

12. A system for measuring the charge condition of stored energy within a cylinder comprising a hydraulic accumulator;

a first element configured to move linearly along a longitudinal axis within an interior volume of the hydraulic accumulator to adjustably separate an oil-containing portion of the interior volume on an oil side of the accumulator from a gas-containing portion on a gas side of the accumulator;

a sensor package for sensing a current position of the first element along the longitudinal axis; and an electrical connector connected to the sensor package for signaling the position of the first element within the hydraulic accumulator, wherein the sensor comprises a flexible connector, wherein the hydraulic accumulator is a bladder-type accumulator and the first element comprises a bladder having a flexible membrane movable at a distal end along the longitudinal axis, and wherein the flexible connector is extendibly attached to an interior surface of the bladder at the distal end of the bladder.

13. The system of claim 12, wherein the flexible connector extends to the interior surface of the bladder along the longitudinal axis of the hydraulic accumulator.

14. The system of claim 12 wherein the sensor package is installed on the oil side of the accumulator.

15. The system of claim 12 wherein the sensor package is installed on the gas side of the accumulator.

16. The system of claim 12 where the sensor package is a linear position sensor in contact with a linear variable displacement transducer.

17. The system of claim 12 wherein the sensor package contains a flexible connector.

18. The system of claim 12 further comprising a signal conditioner in communication with the sensor package.

19. The system of claim 18 wherein the signal conditioner provides a pressure seal to the hydraulic accumulator.

* * * * *